United States Patent Office 2,804,050
Patented Aug. 27, 1957

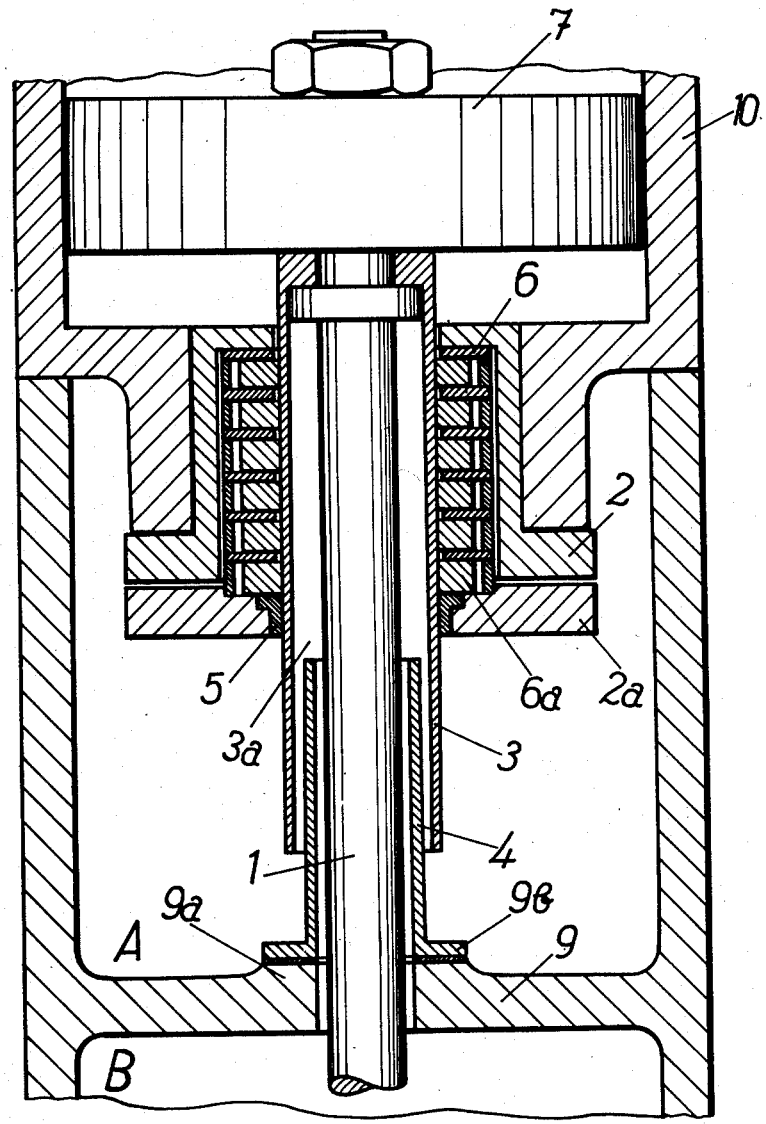

2,804,050

PISTON ROD SEAL

Heinz E. Spilling, Hamburg, Germany

Application May 18, 1955, Serial No. 509,303
In Germany October 29, 1949

Public Law 619, August 23, 1954
Patent expires October 29, 1969

3 Claims. (Cl. 121—1)

The present invention relates to engines, for instance steam engines, in which the chamber housing the driving mechanism is separated from the stuffing box by a partition, and said stuffing box surrounding a piston rod near a cylinder having reciprocably mounted therein a piston connected to said piston rod. More specifically, the present invention concerns the sealing of the passage through which the piston rod passes into the chamber housing the driving mechanism.

Piston rod sealings are known in which the sealing means directly slide on the piston rod. The drawback of such an arrangement consists in that the working medium of the cylinder, which medium drips or passes along the piston rod cannot completely be kept away from the driving mechanism even if stripper rings precede the passage through which the piston rod passes into the chamber housing the driving mechanism.

It is, furthermore known by means of single or a plurality of serially arranged soft or metal packings to seal two chambers comprising different working media with regard to each other, for instance to seal a chamber comprising the stuffing box with regard to the chamber comprising the driving mechanism. It is, furthermore, known to surround the piston rod by a tube or sleeve to take up the wear of the sealing elements. These known tubes, furthermore, had to guide the piston whereas the inner piston rod serves to transfer the piston forces to the cross head. It has also been suggested to surround the the piston rod of combustion engines with a cooling jacket which returns the cooling means conveyed through the hollow piston rod.

The problem underlying the present invention differs from the problems outlined in the preceding paragraph, and the primary object of the present invention consists in preventing leakage condensate passing from the steam stuffing box along the piston rod from entering the chamber for the driving mechanism which chamber contains the lubricating means.

It is also an object of this invention to prevent the lubricating means in the chamber housing the driving mechanism from entering the steam stuffing box surrounding the piston rod.

These and other objects and advantages of the invention will appear more clearly from the following specification in connection with the accompanying drawing showing a section through a portion of a cylinder, through the chamber comprising the stuffing box, and through a portion of the chamber housing the driving mechanism.

The primary feature of the present invention consists in that the partition between the chamber housing the driving mechanism and the chamber housing the stuffing box has connected thereto a sleeve which extends into the chamber housing the stuffing box and surrounds the piston rod with play, while the piston has connected thereto a protective tube arranged to slide over said sleeve.

Referring now to the drawing in detail, the cylinder 10 has reciprocably mounted therein a piston 7 which latter has connected thereto a piston rod 1. That end of the piston rod 1 which is adjacent the piston 7 is surrounded by a protective tube 3 which is fixedly connected to the piston 7 and is substantially coaxially arranged with regard to the piston rod 1. The protective tube 3 extends through a stuffing box 2 and is guided in a bushing 5 carried by the gland 2a. Sealing rings 6 and packing material 6a seal the cylinder chamber with regard to the chamber A. The inner diameter of the protective tube 3 is such that an annular chamber 3a remains between the piston rod 1 and the protective tube 3. The partition 9 is provided with a flat eye 9a having arranged thereon a gasket 9b upon which is mounted the flange of a sleeve 4 which latter is connected to the partition 9 in any convenient manner, for instance by bolts or the like. The outer diameter of the sleeve 4 is smaller than the inner diameter of the protective tube 3 while the inner diameter of sleeve 4 is larger than the outer diameter of the piston rod 1 so that the sleeve 4 can slide within the annular chamber 3a.

Assuming that the cylinder 10 is a steam cylinder, it will now be clear from the drawing that that portion of the condensate which passes through the stuffing box 2 and flows along on the outside of the protective tube 3 cannot enter the chamber B housing the driving mechanism but will merely drip along on the outside of the sleeve 4 and will accumulate in the chamber A from where it can be removed through any convenient opening in the chamber A not shown in the drawing. Thus any impurification of the oil in the chamber B is prevented. Similarly, the oil in the chamber B is prevented from entering the cylinder 10.

It is, of course, understood that the present invention is, by no means, limited to the particular construction shown in the drawing but also comprises any modifications within the scope of the appended claims.

What I claim is:

1. In combination: a reciprocable piston rod, a piston connected to said piston rod, a first chamber for housing the driving mechanism for said piston rod, a second chamber superimposed upon said first chamber, one of said chambers including partition means separating said chambers from each other and being provided with a passage therethrough, said piston rod extending through said passage and being reciprocable therethrough, a protective sleeve connected to that side of said partition means which faces said piston, said sleeve surrounding the adjacent portion of said piston rod in spaced relationship thereto whereby said piston rod can reciprocate therethrough in a frictionless manner, a protective tubular member connected to and connected with said piston and surrounding a portion of said piston rod in spaced relationship thereto so as to define therewith an annular chamber, said sleeve extending into said annular chamber and having its outer surface at all times in spaced relationship to the inner surface of said tubular member whereby said tubular member can reciprocate relative to said sleeve without frictionally engaging the same, and stuffing box means arranged in said second chamber and engaging said tubular member to effect a seal therewith.

2. An arrangement according to claim 1, in which said stuffing box means includes a gland provided with a bushing slidably engaging said tubular member for guiding the same.

3. In combination: a reciprocable piston rod, a first chamber for housing the driving mechanism for said piston rod, a second chamber superimposed upon said first chamber, one of said chambers including partition means separating said chambers from each other and being provided with a passage therethrough, said piston rod extending through said second chamber and through said passage into said first chamber, a tubular member reciprocable together with said piston rod and surrounding a portion thereof in spaced relationship thereto, a stationary sleeve arranged in said second chamber and mounted on said partition, said sleeve surrounding a portion of said reciprocable piston rod in spaced relationship thereto while at all times extending into said tubular member with the outer surface of said sleeve spaced from the inner surface of said tubular member whereby said piston rod and said tubular member can reciprocate relative to said stationary sleeve without frictionally engaging the same, a stuffing box arranged in said second chamber, and packing means arranged in said stuffing box and engaging said tubular member from the outside thereof to effect a seal therewith.

References Cited in the file of this patent
UNITED STATES PATENTS

| | | |
|---|---|---|
| 1,239,869 | Block | Sept. 11, 1917 |
| 2,218,839 | Armstrong et al. | Oct. 22, 1940 |